(12) United States Patent
Ikemoto et al.

(10) Patent No.: US 8,009,101 B2
(45) Date of Patent: Aug. 30, 2011

(54) WIRELESS IC DEVICE

(75) Inventors: Nobuo Ikemoto, Moriyama (JP);
Noboru Kato, Moriyama (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 938 days.

(21) Appl. No.: 11/851,651

(22) Filed: Sep. 7, 2007

(65) Prior Publication Data

US 2008/0246664 A1    Oct. 9, 2008

(30) Foreign Application Priority Data

Apr. 6, 2007    (JP) ................. 2007-101145

(51) Int. Cl.
*H01Q 9/04*    (2006.01)
*H01Q 1/36*    (2006.01)

(52) U.S. Cl. ............ 343/700 MS; 343/89; 343/895

(58) Field of Classification Search ........... 343/700 MS, 343/866, 873, 895, 728, 729, 737, 751, 764, 343/853; 235/492
See application file for complete search history.

(56) References Cited

U.S. PATENT DOCUMENTS

| | | | |
|---|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,757,074 A | 5/1998 | Matloubian et al. |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |

(Continued)

FOREIGN PATENT DOCUMENTS

EP    0 977 145 A2    2/2000

(Continued)

OTHER PUBLICATIONS

English translation of NL9100176, published on Mar. 2, 1992.

(Continued)

*Primary Examiner* — Douglas W Owens
*Assistant Examiner* — Chuc D Tran
(74) *Attorney, Agent, or Firm* — Keating & Bennett, LLP

(57) ABSTRACT

A wireless IC device includes a spiral line electrode portion and a first capacitance electrode connected to the inner end of the line electrode portion, which are disposed on the top surface of a substrate. A second capacitance electrode opposing the first capacitance electrode and a cross line electrode, which connects the second capacitance electrode and a connecting portion that connects the top and bottom surfaces, are disposed on the bottom surface of the substrate. The connecting portion electrically connects the outer end of the line electrode portion and an end of the cross line electrode. A wireless IC is mounted such that terminal electrodes thereof are connected to the connecting portion and an end of a radiating electrode. A radiating/resonating electrode including the line electrode portion, the capacitance electrodes, and the cross line electrode can act both as a resonant circuit for a resonant tag and as a radiating electrode serving as an RFID tag.

14 Claims, 11 Drawing Sheets

U.S. PATENT DOCUMENTS

| | | |
|---|---|---|
| 6,181,287 B1 * | 1/2001 | Beigel ............................ 343/741 |
| 6,190,942 B1 | 2/2001 | Wilm et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,366,260 B1 | 4/2002 | Carrender |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,796,508 B2 * | 9/2004 | Muller ............................ 235/492 |
| 6,828,881 B2 | 12/2004 | Mizutani et al. |
| 6,837,438 B1 * | 1/2005 | Takasugi et al. ............... 235/492 |
| 6,879,258 B2 * | 4/2005 | Kuroda et al. ............. 340/572.1 |
| 6,927,738 B2 | 8/2005 | Senba et al. |
| 6,963,729 B2 | 11/2005 | Uozumi |
| 6,975,834 B1 * | 12/2005 | Forster ........................ 455/277.2 |
| 7,088,248 B2 * | 8/2006 | Forster ........................ 340/572.7 |
| 7,088,307 B2 | 8/2006 | Imaizumi |
| 7,100,835 B2 * | 9/2006 | Selker ............................ 235/492 |
| 7,112,952 B2 | 9/2006 | Arai et al. |
| 7,119,693 B1 | 10/2006 | Devilbiss |
| 7,129,834 B2 | 10/2006 | Naruse et al. |
| 7,152,804 B1 | 12/2006 | MacKenzie et al. |
| 7,168,150 B2 * | 1/2007 | Eckstein et al. ................. 29/593 |
| 7,183,917 B2 * | 2/2007 | Piccoli et al. ............. 340/572.1 |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 7,519,328 B2 * | 4/2009 | Dokai et al. .................. 455/41.2 |
| 7,821,401 B2 * | 10/2010 | Martin et al. .............. 340/572.5 |
| 2002/0011967 A1 | 1/2002 | Goff et al. |
| 2002/0044092 A1 | 4/2002 | Kushihi |
| 2002/0067316 A1 | 6/2002 | Yokoshima et al. |
| 2003/0206107 A1 | 11/2003 | Goff et al. |
| 2004/0001027 A1 | 1/2004 | Killen et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2005/0001785 A1 | 1/2005 | Ferguson et al. |
| 2005/0052283 A1 | 3/2005 | Collins et al. |
| 2005/0092836 A1 | 5/2005 | Kudo |
| 2005/0099337 A1 | 5/2005 | Takei et al. |
| 2005/0122211 A1 * | 6/2005 | Yoshigi et al. ............... 340/10.1 |
| 2005/0125093 A1 | 6/2005 | Kikuchi et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0158380 A1 | 7/2006 | Son et al. |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0090955 A1 * | 4/2007 | Cote et al. .................. 340/572.5 |
| 2007/0252700 A1 | 11/2007 | Ishihara et al. |
| 2007/0285335 A1 | 12/2007 | Bungo et al. |
| 2008/0024156 A1 | 1/2008 | Arai et al. |
| 2008/0169905 A1 | 7/2008 | Slatter |
| 2008/0272885 A1 | 11/2008 | Atherton |
| 2009/0002130 A1 | 1/2009 | Kato |

FOREIGN PATENT DOCUMENTS

| | | |
|---|---|---|
| EP | 1 689 031 A2 | 10/2001 |
| JP | 50-143451 A | 11/1975 |
| JP | 62-127140 U | 8/1987 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-245381 A | 9/1997 |
| JP | 09-252217 A | 9/1997 |
| JP | 09-270623 A | 10/1997 |
| JP | 10-505466 A | 5/1998 |
| JP | 10-171954 A | 6/1998 |
| JP | 10-293828 A | 11/1998 |
| JP | 11-149538 A | 6/1999 |
| JP | 11-219420 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-132643 A | 5/2000 |
| JP | 2000-137778 A | 5/2000 |
| JP | 2000-148948 A | 5/2000 |
| JP | 2000-172812 A | 6/2000 |
| JP | 2000-510271 A | 8/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2001-028036 A | 1/2001 |
| JP | 2007-18067 A | 1/2001 |
| JP | 2001-66990 A | 3/2001 |
| JP | 2001-168628 A | 6/2001 |
| JP | 2001-256457 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2002-024776 A | 1/2002 |
| JP | 2002-042076 A | 2/2002 |
| JP | 2002-505645 A | 2/2002 |
| JP | 2002-76750 A | 3/2002 |
| JP | 2002-150245 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-230128 A | 8/2002 |
| JP | 2002-298109 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2003-016412 A | 1/2003 |
| JP | 2003-030612 A | 1/2003 |
| JP | 2003-44789 A | 2/2003 |
| JP | 2003-58840 A | 2/2003 |
| JP | 2003-067711 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |

| | | |
|---|---|---|
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-198230 A | 7/2003 |
| JP | 2003-209421 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-288560 A | 10/2003 |
| JP | 2003-309418 A | 10/2003 |
| JP | 2003-332820 A | 11/2003 |
| JP | 2004-88218 A | 3/2004 |
| JP | 2004-096566 A | 3/2004 |
| JP | 2004-253858 A | 9/2004 |
| JP | 2004-287767 A | 10/2004 |
| JP | 2004-297249 A | 10/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-136528 A | 5/2005 |
| JP | 2005-165839 A | 6/2005 |
| JP | 2005-167327 A | 6/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-031766 A | 2/2006 |
| JP | 2006-39902 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-148518 A | 6/2006 |
| JP | 2006-195795 A | 7/2006 |
| JP | 2006-270212 A | 10/2006 |
| JP | 2006-309401 A | 11/2006 |
| JP | 2007-65822 A | 3/2007 |
| JP | 2007-150868 A | 6/2007 |
| JP | 11-175678 A | 1/2009 |
| NL | 9100176 A | 3/1992 |
| NL | 9100347 A | 3/1992 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/026048 A1 | 3/2007 |

OTHER PUBLICATIONS

English translation of NL9100347, published on Mar. 2, 1992.
Kato et al.: "Antenna," U.S. Appl. No. 11/928,502, filed Oct. 30, 2007.
Kato et al.: Wireless IC Device, U.S. Appl. No. 12/211,117, filed Sep. 16, 2008.
Kato et al.: "Antenna," U.S. Appl. No. 11/688,290, filed Mar. 20, 2007.
Kato et al.: "Electromagnetic-Coupling-Module-Attached Article," U.S. Appl. No. 11/740,509, filed Apr. 26, 2007.
Kato et al.: "Product Including Power Supply Circuit Board," U.S. Appl. No. 12/234,949, filed Sep. 22, 2008.
Kato et al.: "Data Coupler," U.S. Appl. No. 12/252,475, filed Oct. 16, 2008.
Kato et al.; "Information Terminal Device," U.S. Appl. No. 12/267,666, filed Nov. 10, 2008.
Kato et al.: "Wireless IC Device and Wireless IC Device Composite Component," U.S. Appl. No. 12/276,444, filed Nov. 24, 2008.
Dokai et al.: "Optical Disc," U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System," U.S. Appl. No. 12/274,400, filed Nov. 20, 2008.
Kato: "Wireless IC Device," U.S. Appl. No. 11/964,185, filed Dec. 26, 2007.
Kato et al.: "Radio Frequency IC Device," U.S. Appl. No. 12/336,629, filed Dec. 17, 2008.
Kato et al.: "Wireless IC Device and Component for Wireless IC Device," U.S. Appl. No. 12/339,198, filed Dec. 19, 2008.
Dokai et al.: "Wireless IC Device and Component for Wireless IC Device," U.S. Appl. No. 12/359,690,
Kataya et al.: "Wireless IC Device and Electronic Device," U.S. Appl. No. 11/851,661, filed Sep. 7, 2007.
Dokai et al.: "Antenna and Radio IC Device," U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device, and Component for Wireless IC Device," U.S. Appl. No. 11/930,818, filed Oct. 31, 2007.
Kato et al.: "Wireless IC Device," U.S. Appl. No. 12/042,399, filed Mar. 5, 2008.
Official communication issued in related U.S. Appl. No. 12/042,399; mailed on Aug. 25, 2008.
Official Communication issued in corresponding European Patent Application No. 08704248.7, mailed on Nov. 12, 2009.

* cited by examiner

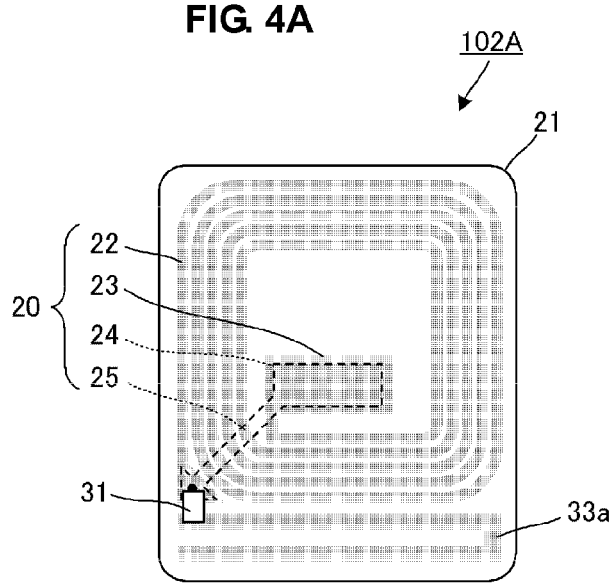
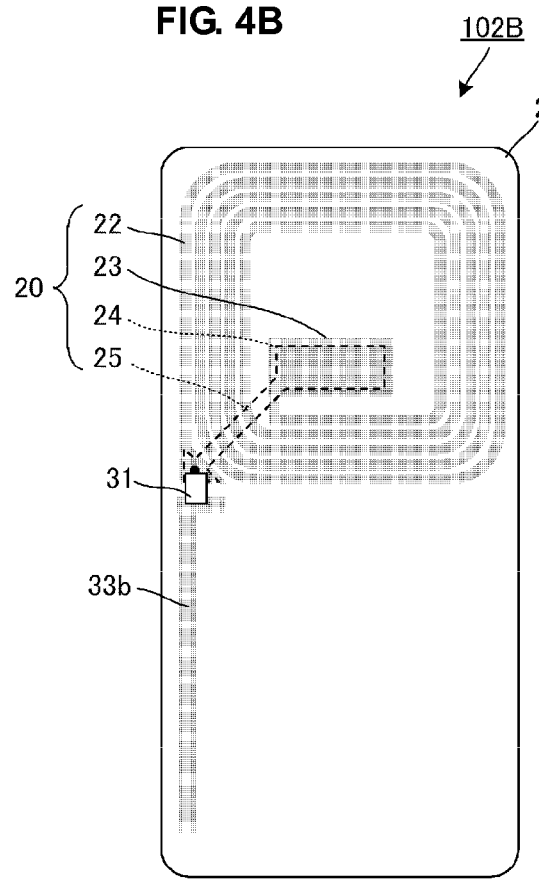
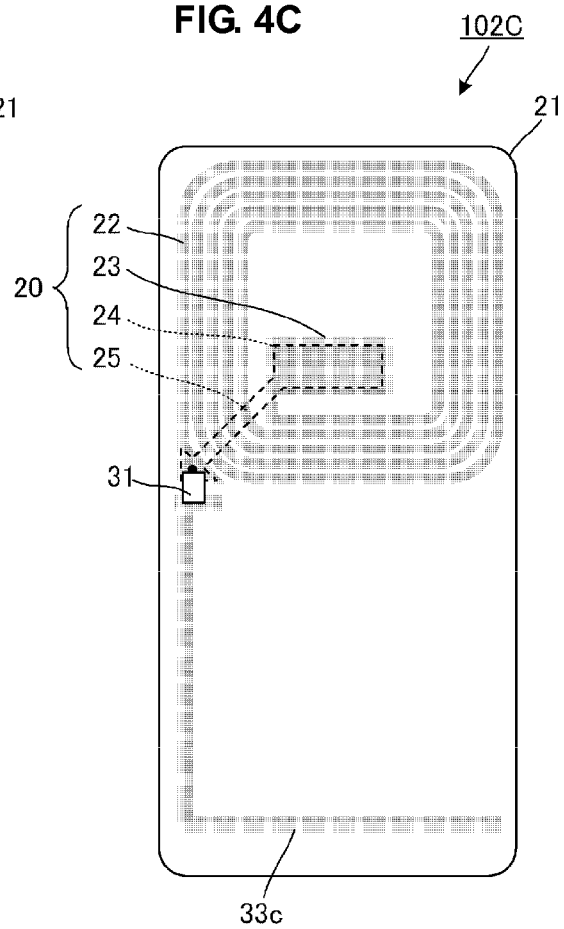

WIRELESS IC DEVICE

BACKGROUND OF THE INVENTION

1. Field of the Invention

The present invention relates to wireless IC devices, and in particular, relates to wireless IC devices using Radio Frequency Identification (RFID) systems enabling data communication using electromagnetic waves in a non-contact manner.

2. Description of the Related Art

Recently, RFID systems enabling information transmission between readers/writers that generate induction fields and RFID tags that store predetermined information on articles in a non-contact manner have been used as systems for controlling articles. Moreover, Japanese Unexamined Patent Application Publication No. 2007-18067 discloses a combination tag including both an RFID tag and a resonant tag.

FIG. 1 illustrates the structure of the combination tag described in Japanese Unexamined Patent Application Publication No. 2007-18067. As shown in FIG. 1, an RFID tag 60 includes an inlet sheet 61 and an overlay sheet 62 that protects surfaces of the inlet sheet 61. The inlet sheet 61 includes a substrate on which an IC chip 64, a first antenna 65, and a second antenna 66 are mounted. The overlay sheet 62 includes a top sheet and a bottom sheet. The first antenna 65 is a substantially spiral coil antenna, and is formed of a conductor electrically connected to two terminals of the IC chip 64. The first antenna 65 generates power for starting a CPU of the IC chip 64, and receives signals sent from an antenna unit of a reader/writer. The second antenna 66 is formed of a conductor as is the first antenna 65. However, the second antenna 66 is electrically insulated from the IC chip 64. The second antenna 66 is a substantially spiral coil antenna whose inductance component L and capacitance component C form an LC resonant circuit.

The second antenna 66 consumes energy by resonating in a near electromagnetic field generated by the antenna unit, resulting in an increase in return loss. The presence of the RFID tag 60 is detected by the reader/writer when the antenna unit detects the return loss.

However, the size of the combination tag described in Japanese Unexamined Patent Application Publication No. 2007-18067 is disadvantageously large since the second antenna for a resonant tag is disposed adjacent to the first antenna for the RFID tag. Moreover, each of the antennas resonates at a frequency corresponding to the inductance determined by the length of the electrode and the stray capacitance generated among wires of the substantially spiral electrode. When an electromagnetic field is radiated to the second antenna, the first antenna operating as an RFID tag in response to the electromagnetic field, the RFID tag and the resonant tag can resonate at the same time in the case where the resonant frequencies of the first antenna and the second antenna are close to each other. At this moment, the electromagnetic field generated at the resonant tag can disturb the electromagnetic field generated at the RFID tag, and can prevent the operation of the antenna as the RFID tag.

SUMMARY OF THE INVENTION

Preferred embodiments of the present invention provide a small wireless IC device including a combination of an RFID tag and a resonant tag with excellent radiation characteristics.

According to a preferred embodiment of the present invention, a wireless IC device includes a radiating/resonating electrode disposed on a substrate and acting both as a radiating electrode in a frequency for RFID and as a resonating electrode that resonates at a frequency that is different from the frequency for RFID; and a wireless IC for RFID mounted on the substrate and electrically connected or electromagnetically coupled with the radiating/resonating electrode. With this unique structure and arrangement, the radiating/resonating electrode acts as a combination tag including an RFID tag and a resonant tag, and the size of the device can be reduced since separate antennas for the RFID tag and the resonant tag are not required. Moreover, the wireless IC device has excellent radiation characteristics since the radiation characteristics are not degraded by the interference between the antennas for the RFID tag and the resonant tag.

The radiating/resonating electrode can include a line electrode portion and a capacitance electrode portion that forms capacitance between both ends of the line electrode portion. With this, the resonant frequency per a predetermined area occupied by the resonant tag can be reduced using the inductance L of the line electrode portion and the lumped capacitance C of the capacitance electrode portion. Alternatively, the occupied area per a predetermined resonant frequency can be reduced. Thus, the size of the entire device can be reduced. Furthermore, the impedance of the capacitance electrode portion at the frequency for RFID is significantly small when the frequency for the RFID tag is higher than or equal to about 10 times the frequency for the resonant tag. Therefore, the radiating/resonating electrode can act as a single radiating electrode, and the radiation characteristics of the electrode as an RFID tag can be further improved.

The capacitance electrode portion can include two capacitance electrodes opposing each other via a dielectric layer in the thickness direction of the capacitance electrode portion. The line electrode portion can have a substantially spiral shape that is coiled around the capacitance electrode portion a plurality of times. The radiating/resonating electrode can further include a cross line electrode that is disposed on the substrate and connects one of the capacitance electrodes with the outer end of the substantially spiral line electrode portion by intersecting with the line electrode portion when viewed in plan, the other capacitance electrode being connected to the inner end of the substantially spiral line electrode portion. The wireless IC can be mounted in the vicinity of the cross line electrode. With this unique structure, the capacitance electrode portion and the wireless IC are regarded as being equivalently connected by the cross line electrode portion in an integrated manner although the line electrode portion is substantially spiral, and can act as a radiating electrode with high radiation efficiency.

The capacitance electrode portion can include two capacitance electrodes opposing each other via a dielectric layer in the thickness direction of the capacitance electrode portion, and the wireless IC can be mounted in the vicinity of one of the capacitance electrodes. When the radiating/resonating electrode includes the line electrode portion and the capacitance electrode portion, and the wireless IC is connected to the capacitance electrode portion, the impedance of the capacitance electrode portion at the frequency for RFID becomes significantly small, and the radiating/resonating electrode can act as a radiating electrode more effectively, thereby improving the radiation characteristics of the RFID tag antenna.

The wireless IC device can further include another radiating/resonating electrode disposed on the substrate, and the wireless IC can be electrically connected or coupled with the pair of radiating/resonating electrodes. When the wireless IC device further includes another radiating/resonating electrode disposed on the substrate and the wireless IC is mounted such that the pair of radiating/resonating electrodes are connected to form a dipole antenna, the pair of radiating/resonating electrodes can act as two resonant tags whose resonant frequencies differ from each other, and at the same time, act as a radiating electrode for an RFID tag having a relatively large area. Thus, excellent radiation characteristics can be achieved.

The wireless IC device can further include a radiating electrode disposed on the substrate, the radiating electrode constituting an equivalent dipole antenna in combination with the radiating/resonating electrode, and the wireless IC can be electrically connected or electromagnetically coupled with the radiating/resonating electrode and the radiating electrode. With this, excellent radiation characteristics can be achieved.

The capacitance electrode portion can be disposed inside the substantially spiral line electrode portion, and the radiating electrode can be disposed outside the substantially spiral line electrode portion. With this unique structure, the radiating electrode is not shielded by the substantially spiral line electrode portion, thereby maintaining excellent radiation characteristics.

The line length of the radiating electrode can correspond to approximately a quarter-wavelength of the frequency for RFID, and the resonant frequency of the radiating/resonating electrode (frequency of the resonant tag) can be lower than the frequency for RFID. With this, the radiating/resonating electrode can act as an equivalent single radiating electrode, and the radiation characteristics of the electrode as an RFID tag can be improved.

The wireless IC can be a wireless IC chip that is electrically connected to the radiating/resonating electrode. With this, the size of the wireless IC can be markedly reduced, and the size and profile of the entire device can be reduced.

The wireless IC can be an electromagnetically coupled module including a feeder circuit board that has a matching circuit including inductors and a wireless IC chip that is disposed on the top surface of the feeder circuit board and is electrically connected to the feeder circuit board. With this, characteristic changes caused by a displacement of the mounting position of the wireless IC can be prevented, and the antenna efficiency can be improved due to more precise impedance matching between the wireless IC chip and the radiating electrode.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 4A to 4C are plan views of wireless IC devices according to a second preferred embodiment of the present invention.

DETAILED DESCRIPTION OF PREFERRED EMBODIMENTS

First Preferred Embodiment

Figure 1:
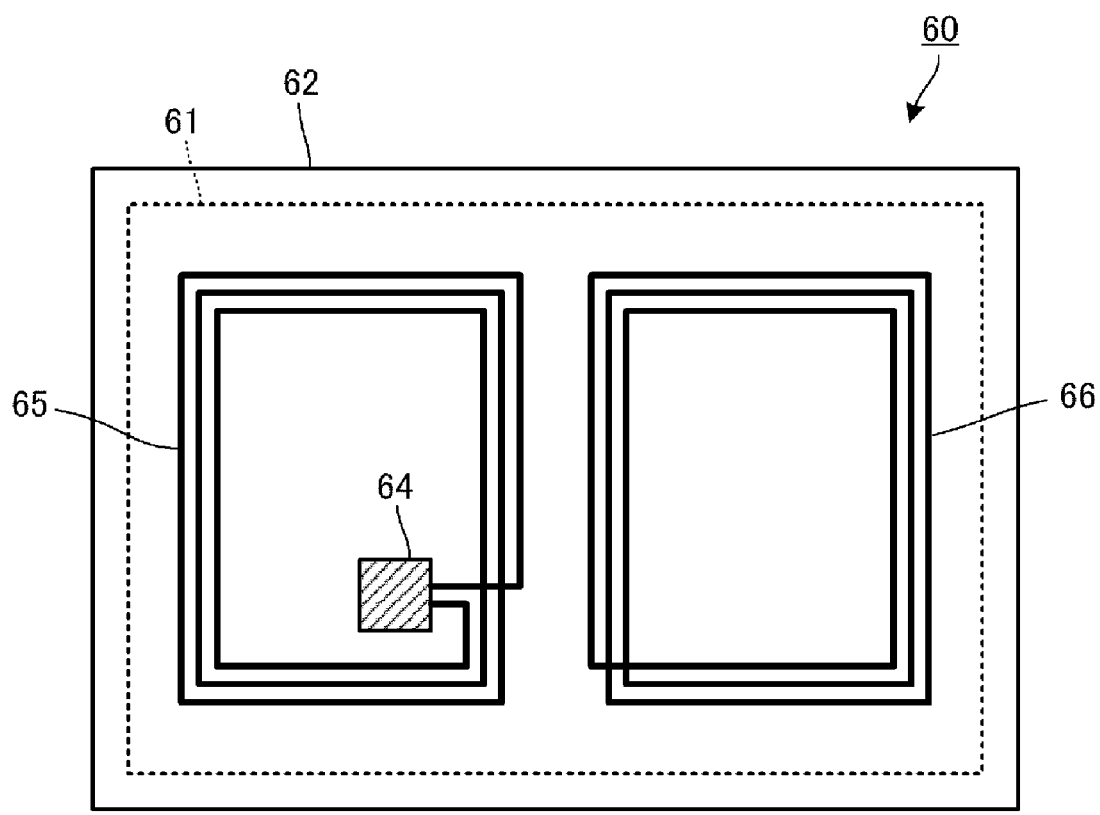
FIG. 1 illustrates the structure of an RFID tag described in Japanese Unexamined Patent Application Publication No. 2007-18067.
Figure 2A:
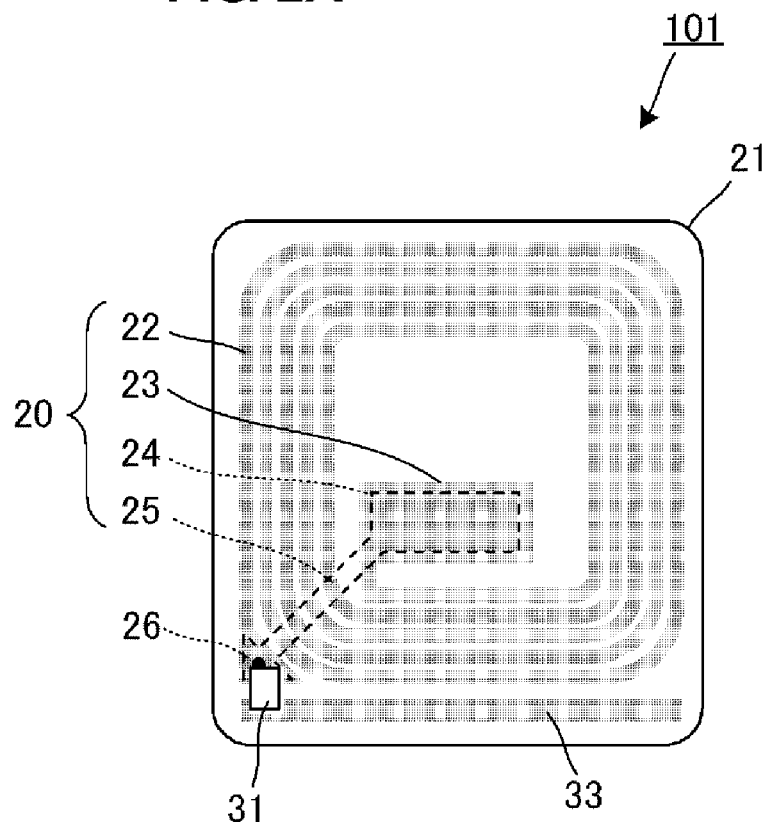
FIGS. 2A and 2B are a plan view and a cross-sectional view, respectively, of a wireless IC device according to a first preferred embodiment of the present invention.
Figure 2B:
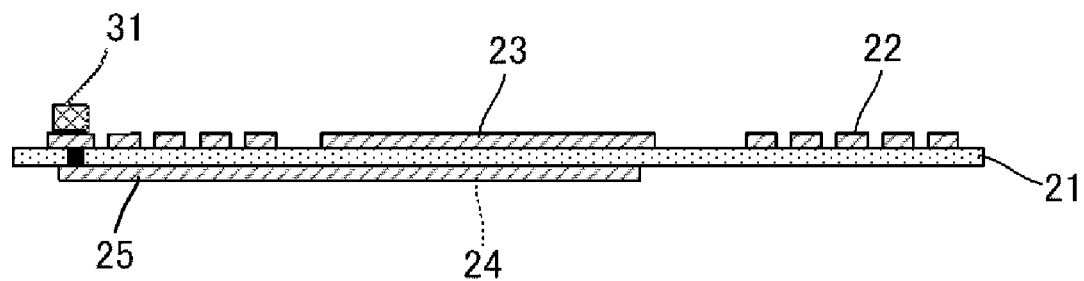

FIGS. 2A and 2B illustrate the structure of a wireless IC device according to a first preferred embodiment. FIG. 2A is a plan view, and FIG. 2B is a cross-sectional view of a principal portion of the wireless IC device. A wireless IC device 101 includes a substrate (insulating sheet) 21 and a wireless IC 31 including a wireless IC chip mounted on the substrate 21. Various electrodes are also disposed on the substrate 21.

In FIGS. 2A and 2B, a desired electrode pattern including a conductor such as copper and aluminum is formed on the substrate 21 composed of a resin film such as polyethylene terephthalate (PET) and polypropylene (PP) in the wireless IC device 101. More specifically, a copper foil or an aluminum foil is patterned by etching using a resin sheet on which the copper foil or the aluminum foil is applied.

As shown in FIGS. 2A and 2B, a substantially spiral line electrode portion 22 and a first capacitance electrode portion 23 connected to the inner end of the line electrode portion 22 are formed on the top surface of the substrate 21. A second capacitance electrode portion 24 opposing the first capacitance electrode portion 23 and a cross line electrode 25 are formed on the bottom (back) surface of the substrate 21. The cross line electrode 25 extends between the second capacitance electrode portion 24 and a position opposing the outer end of the line electrode portion 22 (position of a connecting portion 26 that connects the top and bottom surfaces of the substrate 21) so as to connect the second capacitance electrode portion and the connecting portion by intersecting with the coiled line electrode portion 22 when viewed in plan.

The end of the cross line electrode 25 and the outer end of the line electrode portion 22 are electrically connected at the connecting portion 26.

Moreover, a radiating electrode 33 having a linear shape is disposed on the top surface of the substrate 21. Furthermore, the wireless IC 31 is mounted such that terminal electrodes thereof are connected to an end portion of the radiating electrode 33 and the connecting portion 26.

The wireless IC device shown in FIGS. 2A and 2B acts as a resonant tag and an RFID tag. Operations of the device as a resonant tag will now be described.

The line electrode portion 22 operates as an inductor L using the substantially spiral portion from the outer end thereof to the inner end thereof. The capacitance electrode portions 23 and 24 opposing each other with the substrate 21 therebetween operate as a capacitor C. The inductor L and the capacitor C form an LC resonant circuit that operates as a resonant tag. When the resonant frequency of the LC resonant circuit is set to a frequency required as a resonant tag (for example, 8.2 MHz), the LC resonant circuit is coupled with an induction field generated by an antenna of a resonant-tag reader at the frequency, and subjects the induction field to perturbation. That is, the LC resonant circuit resonates in a near electromagnetic field generated by the antenna of the resonant-tag reader, and consumes energy. This leads to an increase in return loss, and the presence of the wireless IC device 101 is detected by the resonant-tag reader when it detects the return loss.

The wireless IC 31 and the radiating electrode 33 do not affect the resonant tag since the wireless IC 31 and the radiating electrode 33 exist outside the closed LC resonant circuit.

Figure 3A:
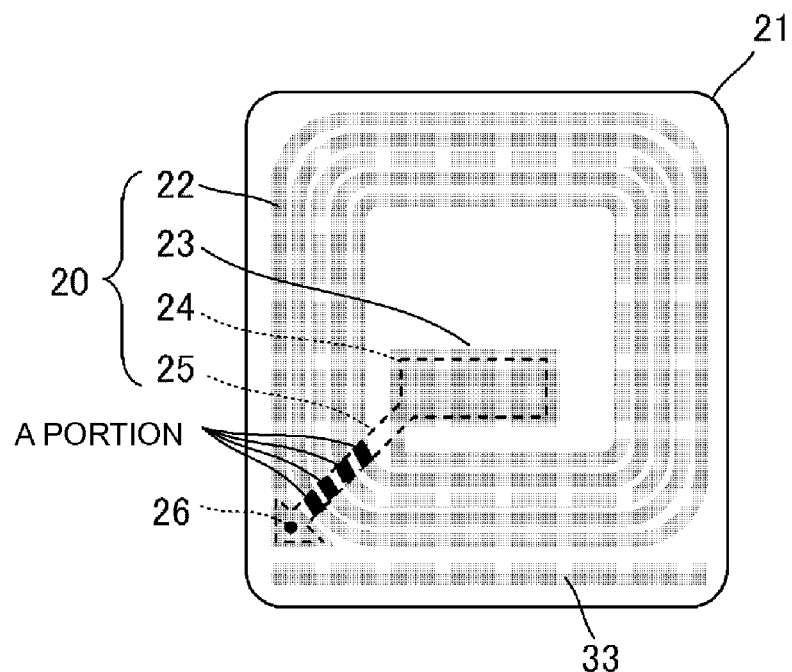
FIGS. 3A and 3B illustrate effects of the wireless IC device as an RFID tag.
Figure 3B:
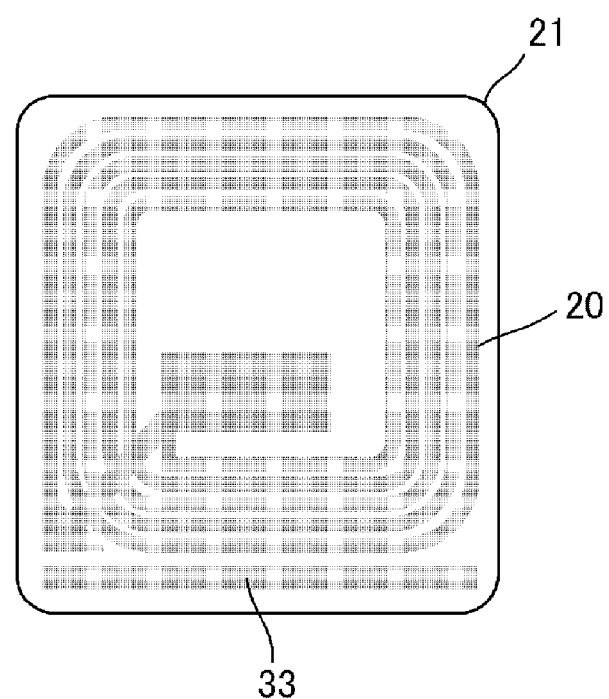

Next, operations of the device as an RFID tag will be described with reference to FIGS. 3A and 3B. FIG. 3A illustrates a state before the wireless IC 31 is mounted. Although capacitance is formed between the cross line electrode 25 and the line electrode portion 22 that intersects with the cross line electrode 25 via the substrate 21 (A portion), the impedance determined by the capacitance is significantly low in a frequency band for RFID. Similarly, the impedance determined by the capacitance formed between the capacitance electrode portions 23 and 24 is significantly low in the frequency band for RFID. Therefore, the line electrode portion 22, the capacitance electrode portions 23 and 24, and the cross line electrode 25 act as a continuous radiating/resonating electrode 20 as shown in FIG. 3B in the frequency band for the RFID tag (for example, 900 MHz in the UHF band). This radiating/resonating electrode 20 and the radiating electrode 33 act as a dipole antenna.

The length of the radiating electrode 33 is set to approximately a quarter-wavelength of the RFID frequency. However, the length or the size of the radiating electrode is not limited to a quarter-wavelength, and can be any other values as long as the radiating electrode can act as a radiating electrode, in particular, as a radiating electrode of a dipole antenna in the RFID frequency band.

When the frequencies of the resonant tag and the RFID tag are compared, the frequency of the RFID tag is desirably higher than or equal to about 10 times that of the resonant tag. With this, the capacitance at the A portion shown in FIG. 3A can be regulated at a few picofarads, and thus the impedance can be regulated at a few tens of ohms in the UHF band when the wireless IC device 101 operates as an RFID tag. Accordingly, the wireless IC device 101 acts as a single electrode as shown in FIG. 3B having a directivity similar to that of a dipole antenna.

Second Preferred Embodiment

FIGS. 4A to 4C are plan views of wireless IC devices according to a second preferred embodiment. The wireless IC device shown in FIGS. 2A and 2B has the linear radiating electrode 33 disposed along a side of the substantially spiral line electrode portion 22 and along a side of the substrate 21. The wireless IC devices shown in FIGS. 4A to 4C have radiating electrodes whose shapes are different from that shown in FIGS. 2A and 2B. In FIG. 4A, a radiating electrode 33a extends along a side of a line electrode portion 22 and along a side of a substrate 21 so as to be turned back.

In FIG. 4B, a radiating electrode 33b linearly extends along a side of the substrate 21 in a direction away from a radiating/resonating electrode 20.

In FIG. 4C, a radiating electrode 33c extends along two sides of the substrate 21 so as to have a substantially L-shaped configuration.

In FIGS. 4A to 4C, structures and operations other than those described above are the same as those in the first preferred embodiment. In the structure shown in FIG. 4A, the equivalent line length (electrical length) of the radiating electrode 33a can be increased, and the area of the substrate 21 required for an RFID tag to communicate using the carrier frequency of the RFID tag can be correspondingly reduced substantially without increasing the area of the substrate 21.

In the structure shown in FIG. 4B, radiation efficiency of the electrodes as a dipole antenna can be improved since the radiating electrode 33b extends so as to be separated from the radiating/resonating electrode 20. Accordingly, the sensitivity of the device as an RFID tag can be improved.

In the structure shown in FIG. 4C, the size of the entire device can be reduced while the sensitivity of the RFID tag is improved since the line length (electrical length) of the radiating electrode 33c can be adjusted as appropriate by effectively utilizing the area of the substrate 21.

Third Preferred Embodiment

Figure 5A:
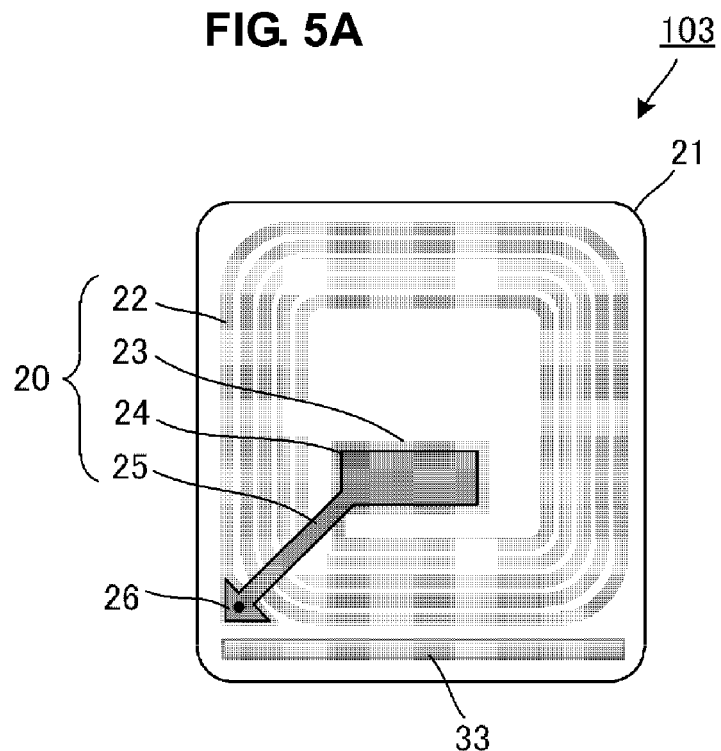
FIGS. 5A and 5B are a plan view and a cross-sectional view, respectively, of a wireless IC device according to a third preferred embodiment.
Figure 5B:
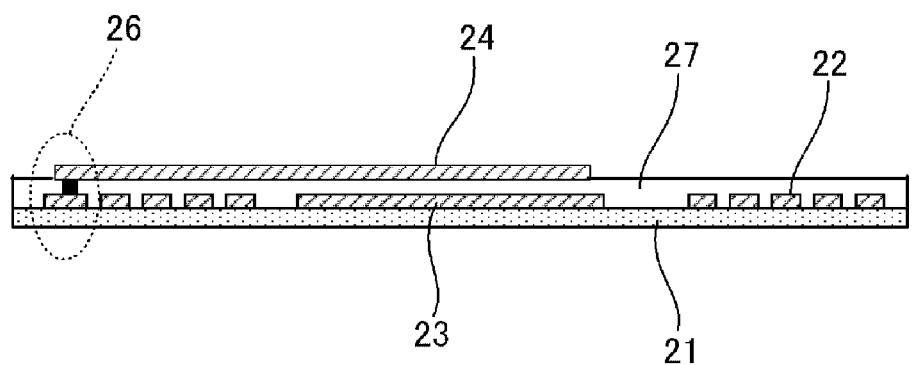

FIGS. 5A and 5B illustrate the structure of a wireless IC device according to a third preferred embodiment. FIG. 5A is a plan view, and FIG. 5B is a cross-sectional view of a principal part of the wireless IC device. In the wireless IC device shown in FIGS. 2A and 2B, electrodes are disposed on the top and bottom surfaces of the substrate 21 such that capacitance is formed at the capacitance electrode portions that oppose each other with the substrate 21 therebetween. In the wireless IC device shown in FIGS. 5A and 5B, a circuit is formed by utilizing only the top surface of a substrate 21. That is, a substantially spiral line electrode portion 22 and a first capacitance electrode portion 23 connected to the inner end of the line electrode portion 22 are disposed on the top surface of the substrate 21, and an insulating layer 27 is disposed on the electrodes. A second capacitance electrode portion 24 is disposed on the top surface of the insulating layer 27 at a position opposing the first capacitance electrode portion 23, and a cross line electrode 25 is disposed on the top surface of the insulating layer 27 so as to extend from the second capacitance electrode portion 24 to a position of the outer end of the line electrode portion 22. A connecting portion 26 is formed by punching a hole that extends from the end of the cross line electrode 25 to the outer end of the line electrode portion 22. A radiating electrode 33 can be disposed on the top surface of the substrate 21 or on the top surface of the insulating layer 27. When the radiating electrode 33 is disposed on the top surface of the substrate 21, the insulating layer 27 is not located at at least a position on the radiating electrode 33 where a wireless IC is to be mounted.

The wireless IC is mounted such that the terminal electrodes thereof are connected to the connecting portion 26 and an end portion of the radiating electrode 33 as is the wireless IC shown in FIGS. 2A and 2B.

Larger capacitance can be formed when the capacitance electrode portions 23 and 24 are disposed so as to oppose each other with the insulating layer 27 therebetween as described above. In addition, larger capacitance can also be formed at a position where the cross line electrode 25 and the line electrode portion 22 oppose each other. Thus, a radiating/resonating electrode 20 can act as a radiating electrode more effectively in the frequency band for the RFID tag.

Fourth Preferred Embodiment

Figure 6:
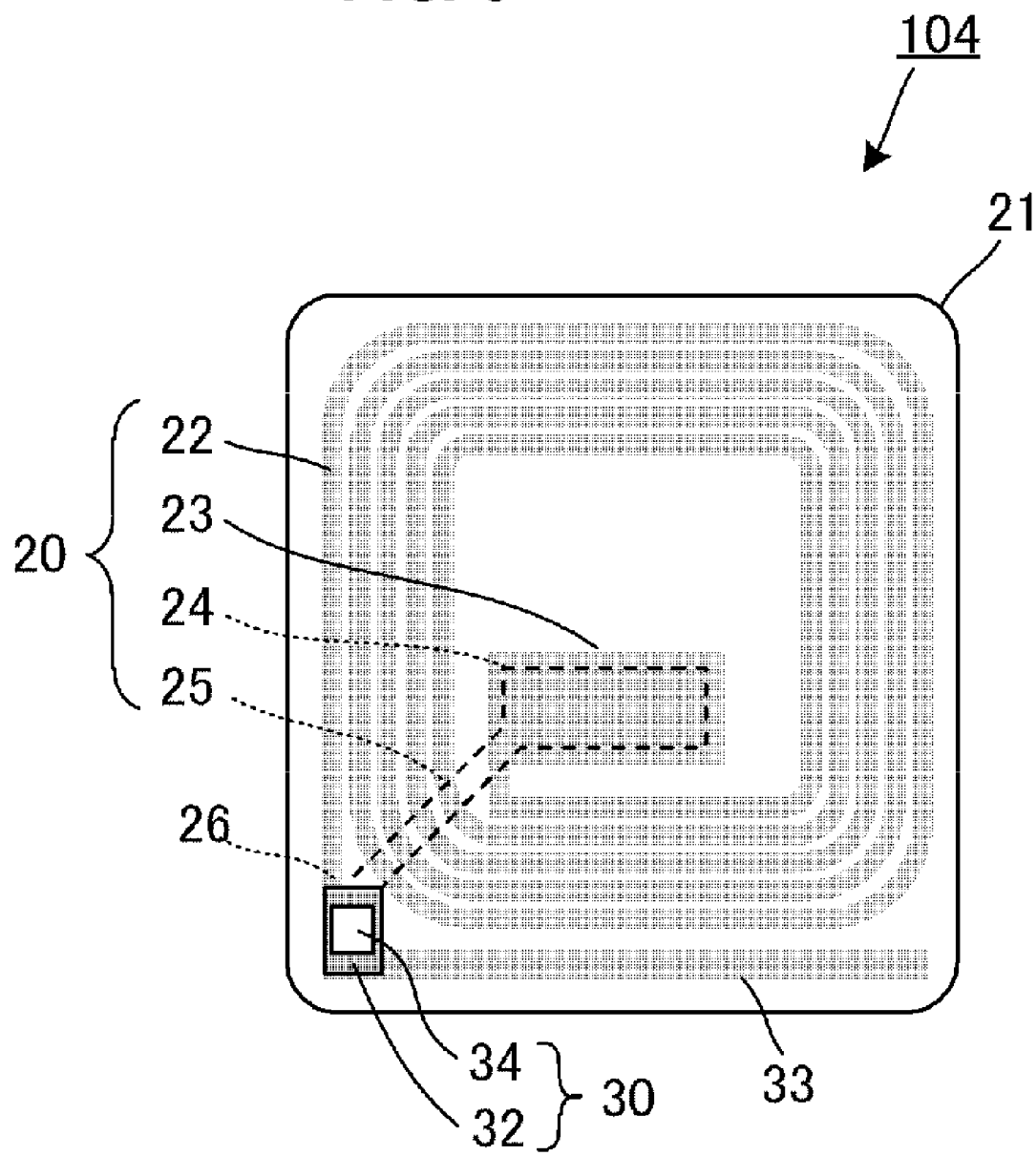
FIG. 6 is a plan view of a wireless IC device according to a fourth preferred embodiment of the present invention.
Figure 7:
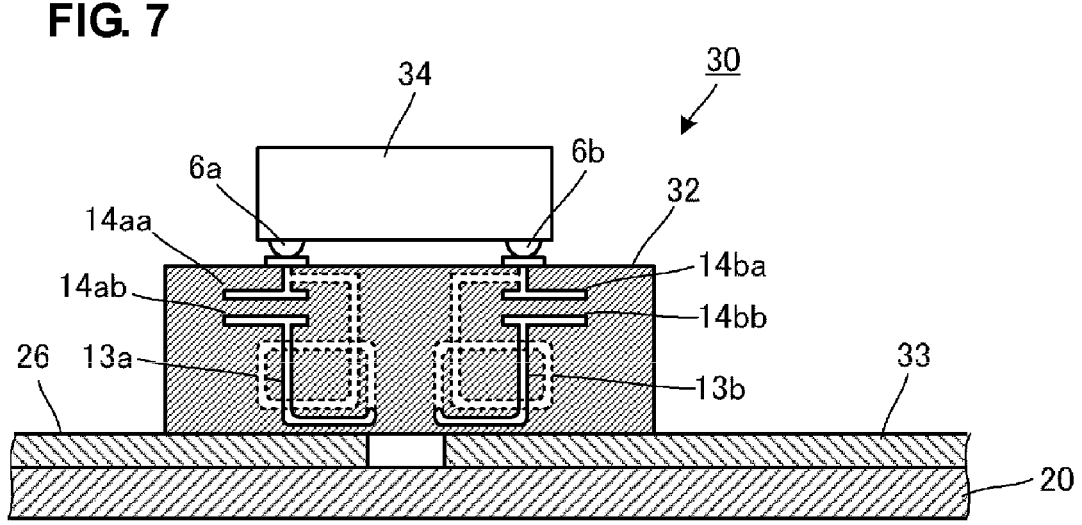
FIG. 7 is a cross-sectional view of an electromagnetically coupled module used in the wireless IC device.

FIG. 6 is a plan view of a wireless IC device 104 according to a fourth preferred embodiment. FIG. 7 is a cross-sectional view of an electromagnetically coupled module 30 used in the wireless IC device 104.

The electromagnetically coupled module 30 includes a feeder circuit board 32 and a wireless IC chip 34 disposed thereon. In the first to third preferred embodiments, the two connecting terminals of the wireless IC 31 preferably are directly connected to the radiating/resonating electrode 20 and the radiating electrode 33. However, in the wireless IC device shown in FIG. 6, the electromagnetically coupled module 30 is electromagnetically coupled to a radiating/resonating electrode 20 and a radiating electrode 33.

As shown in FIG. 7, capacitor electrodes 14aa, 14ab, 14ba, and 14bb and inductor conductors 13a and 13b are disposed inside the feeder circuit board 32. Electrode pads connected to the capacitor electrodes 14aa and 14ba are disposed on the top surface of the feeder circuit board 32, and are joined to corresponding solder bumps 6a and 6b of the wireless IC chip 34.

The wireless IC chip 34 includes a circuit for feeding power to the solder bump 6a and a circuit for feeding power to the solder bump 6b. Therefore, the capacitance between the capacitor electrodes 14aa and 14ab and the inductance of the inductor conductor 13a define an LC circuit, and the inductor conductors 13a and 13b are magnetically coupled to the connecting portion 26 and the radiating electrode 33, respectively. In this manner, the wireless IC chip 34 and the dipole antenna are electromagnetically coupled to each other while the impedances thereof are matched to each other. With this, characteristic changes caused by a displacement of the mounting position of the wireless IC can be prevented, and the antenna efficiency can be improved due to more precise impedance matching between the wireless IC chip and the radiating electrode.

Fifth Preferred Embodiment

Figure 8:
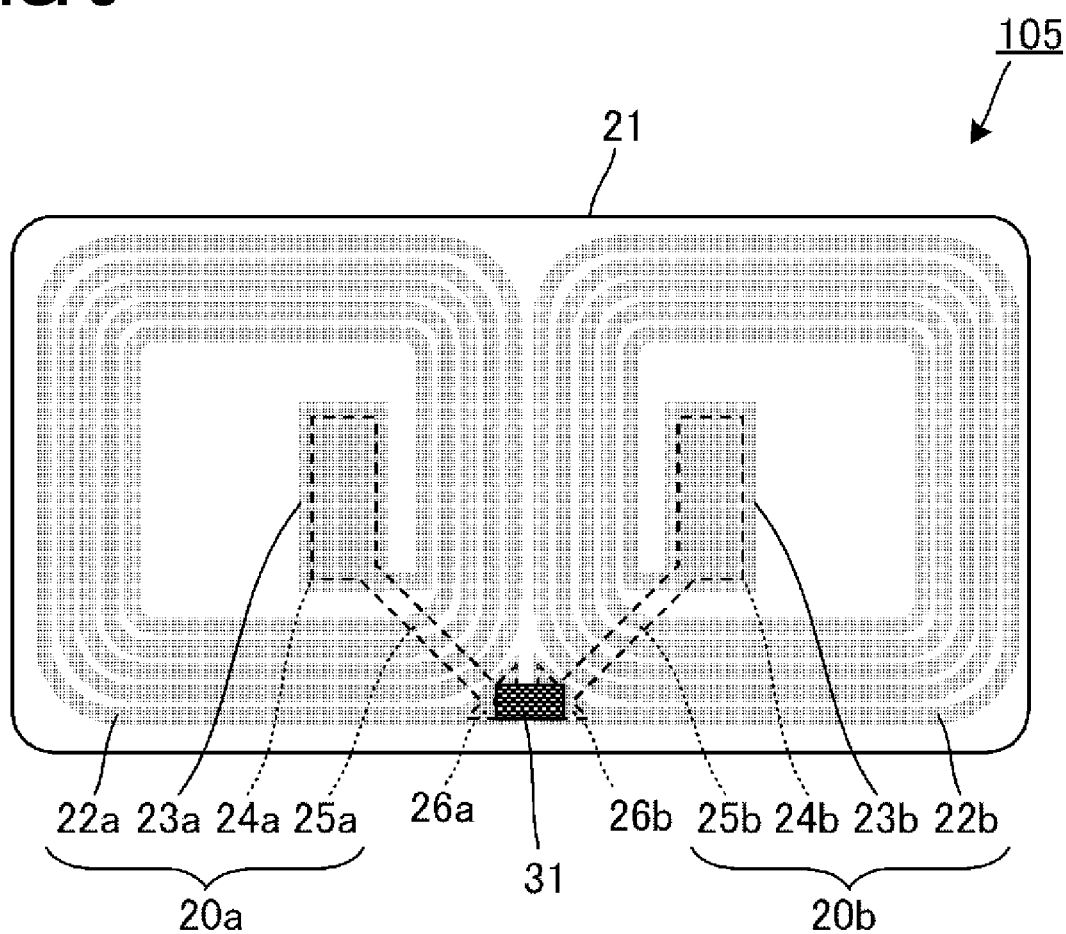
FIG. 8 is a plan view of a wireless IC device according to a fifth preferred embodiment of the present invention.

FIG. 8 is a plan view of a wireless IC device 105 according to a fifth preferred embodiment. This wireless IC device 105 according to the fifth preferred embodiment includes two radiating/resonating electrodes 20a and 20b for resonant tags, which are also used as a radiating electrode for RFID.

Two substantially spiral line electrode portions 22a and 22b and first capacitance electrode portions 23a and 23b connected to the inner ends of the line electrode portions 22a and 22b, respectively, are disposed on the top surface of a substrate 21. Moreover, second capacitance electrode portions 24a and 24b opposing the first capacitance electrode portions 23a and 23b, respectively, and cross line electrodes 25a and 25b are disposed on the bottom surface of the substrate 21. The cross line electrodes 25a and 25b extend between the second capacitance electrode portions 24a and 24b and connecting portions 26a and 26b, respectively, so as to connect the second capacitance electrode portions and the connecting portions by intersecting with the line electrode portions when viewed in plan. The ends of the cross line electrodes 25a and 25b are electrically connected to the outer ends of the line electrode portions 22a and 22b, respectively, at the connecting portions 26a and 26b.

Furthermore, a wireless IC 31 is mounted such that the terminal electrodes thereof are connected to the connecting portions 26a and 26b. The radiating/resonating electrode 20a including the line electrode portion 22a, the capacitance electrode portions 23a and 24a, and the cross line electrode 25a acts as a resonant circuit for a resonant tag. The radiating/resonating electrode 20b including the line electrode portion 22b, the capacitance electrode portions 23b and 24b, and the cross line electrode 25b acts as a resonant circuit for another resonant tag. The two radiating/resonating electrodes 20a and 20b act as a radiating electrode in the frequency band used for the RFID tag as in the above-described preferred embodiments. Therefore, this structure corresponds to that having a dipole antenna connected to the wireless IC 31.

Since the two radiating/resonating electrodes 20a and 20b are substantially symmetrical to each other in this structure, radiation characteristics of the electrodes as an RFID tag can be further improved.

The resonant frequencies of the two resonators for the resonant tags can be the same. However, the wireless IC device can be applied to resonant tags of two different standards when the resonant frequencies of the resonators are set so as to differ from each other.

Sixth Preferred Embodiment

Figure 9:
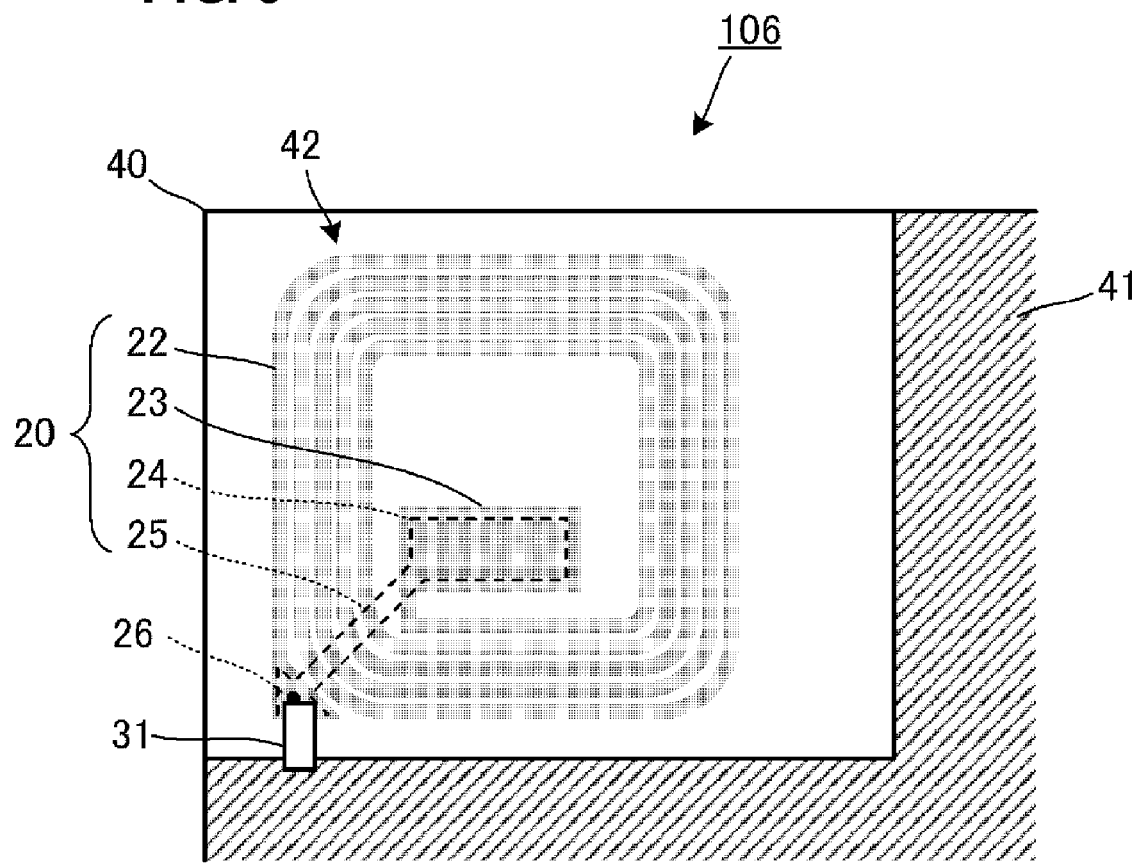
FIG. 9 is a plan view of a wireless IC device according to a sixth preferred embodiment of the present invention.

FIG. 9 is a partial plan view of a wireless IC device according to a sixth preferred embodiment. In the first to fifth preferred embodiments, the wireless IC devices preferably are formed using substrate sheets, and are used by, for example, being stuck to articles. In the sixth preferred embodiment, a wireless IC device 106 is disposed on a circuit board of, for example, a terminal unit (cellular phone) of a mobile communication system.

In FIG. 9, a non-grounded area 42 where a ground electrode 41 is not located is provided for a circuit board 40 at an end portion thereof. A substantially spiral line electrode portion 22 and a first capacitance electrode portion 23 connected to the inner end of the line electrode portion 22 are disposed on the top surface of the circuit board 40 in the non-grounded area 42. A second capacitance electrode portion 24 opposing the first capacitance electrode portion 23 and a cross line electrode 25 are disposed on the bottom (back) surface of the circuit board 40 in the non-grounded area 42. The cross line electrode 25 extends between the second capacitance electrode portion 24 and a position opposing the outer end of the line electrode portion 22 (position of a connecting portion 26) so as to connect the second capacitance electrode portion and the connecting portion by intersecting with the coiled line electrode portion 22 when viewed in plan. The end of the cross line electrode 25 and the outer end of the line electrode portion 22 are electrically connected at the connecting portion 26.

Furthermore, a wireless IC 31 is mounted such that the terminal electrodes thereof are electrically connected to the connecting portion 26 and the ground electrode 41. A radiating/resonating electrode 20 including the line electrode portion 22, the capacitance electrode portions 23 and 24, and the cross line electrode 25 acts as a resonant circuit for a resonant tag. In addition, the radiating/resonating electrode 20 acts as a radiating electrode for an RFID tag. Since one of the terminal electrodes of the wireless IC 31 is connected to the radiating/resonating electrode 20 and the other terminal electrode is connected to the ground electrode 41, the wireless IC device acts as a monopole antenna.

According to this structure, the wireless IC device can be mounted on the circuit board of, for example, a cellular phone, and another radiating electrode for constituting a dipole antenna does not need to be provided. This can lead to a reduction in the area of the wireless IC device.

The wireless IC device according to any one of the first to fifth preferred embodiments can be stuck on the top surface of the circuit board 40 in the non-grounded area 42, and the wireless IC 31 can be mounted such that the terminal electrodes thereof are electrically connected to the radiating/resonating electrode 20 and the ground electrode 41.

Seventh Preferred Embodiment

Figure 10:
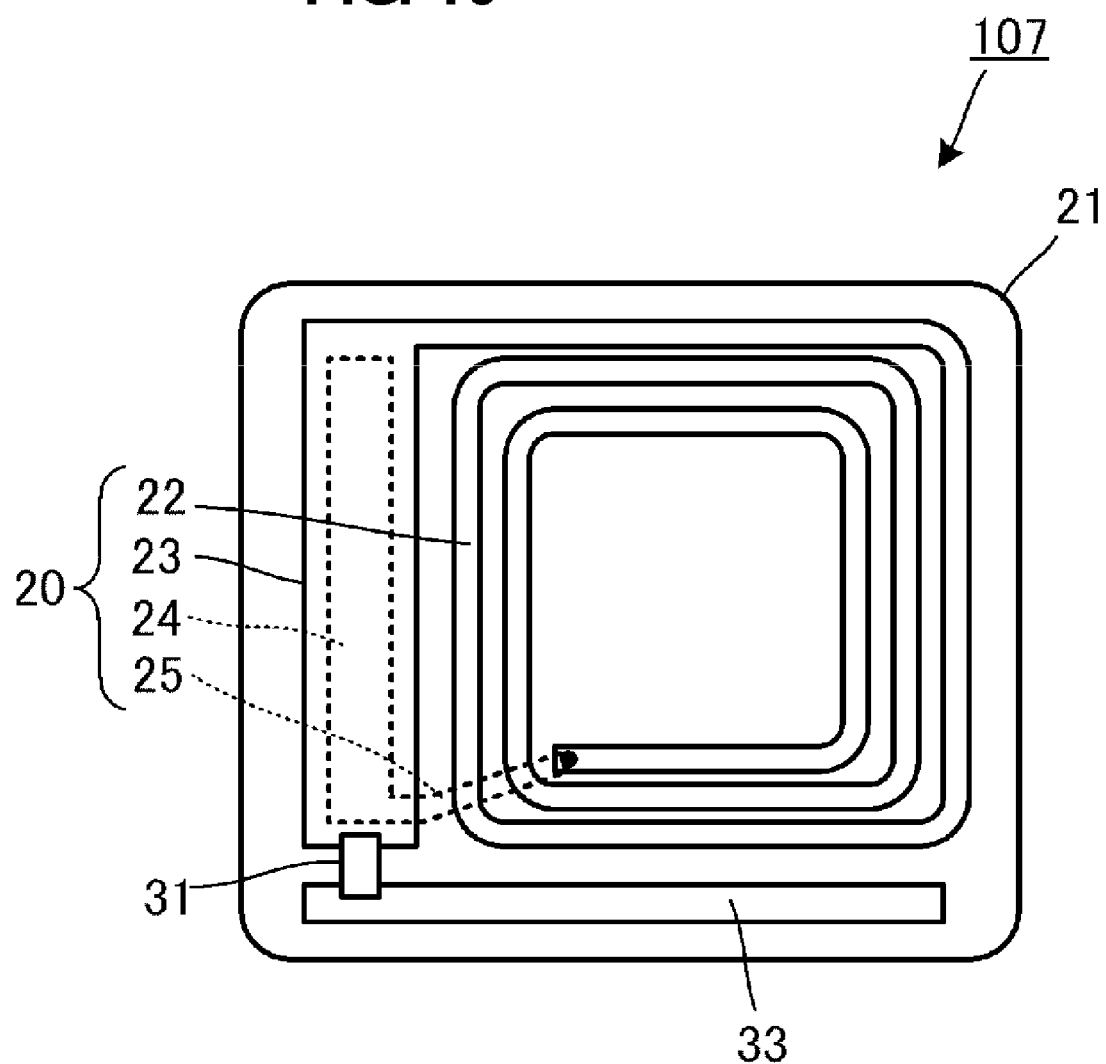
FIG. 10 is a plan view of a wireless IC device according to a seventh preferred embodiment of the present invention.

FIG. 10 is a plan view of a wireless IC device according to a seventh preferred embodiment. In the wireless IC devices according to the first to sixth preferred embodiments, the capacitance electrode portions are disposed inside the substantially spiral line electrode portion. In this wireless IC device shown in FIG. 10, capacitance electrode portions are disposed outside a substantially spiral line electrode portion. That is, a substantially spiral line electrode portion 22 and a first capacitance electrode portion 23 connected to the outer end of the line electrode portion 22 are disposed on the top surface of a substrate 21, and a second capacitance electrode portion 24 opposing the first capacitance electrode portion 23 and a cross line electrode 25 are disposed on the bottom surface of the substrate 21. The cross line electrode 25 extends between the second capacitance electrode portion 24 and a position opposing the inner end of the line electrode portion 22. The end of the cross line electrode 25 on the bottom surface and the inner end of the line electrode portion 22 on the top surface are connected to each other. With this structure, a radiating/resonating electrode 20 including the line electrode portion 22, the capacitance electrode portions 23 and 24, and the cross line electrode 25 can act as a resonant circuit for a resonant tag.

Moreover, a radiating electrode 33 is disposed on the top surface of the substrate 21, and a wireless IC 31 is mounted such that the terminal electrodes thereof are electrically connected to an end portion of the radiating electrode 33 and the first capacitance electrode portion 23.

According to this structure, the impedance determined by the capacitance formed at a position where the line electrode portion 22 and the cross line electrode 25 oppose each other and the capacitance formed at a position where the capacitance electrode portions 23 and 24 oppose each other is significantly low in the frequency band for the RFID tag. Therefore, the radiating/resonating electrode 20 can be regarded as one continuous electrode in the frequency band for the RFID tag, and can act as a radiating electrode. In this case, the radiating/resonating electrode can act as a radiating electrode formed of a uniform metallic plate more effectively since the wireless IC is mounted in the vicinity of the cross line electrode 25 and the capacitance electrode portions 23 and 24.

Eighth Preferred Embodiment

Figure 11:
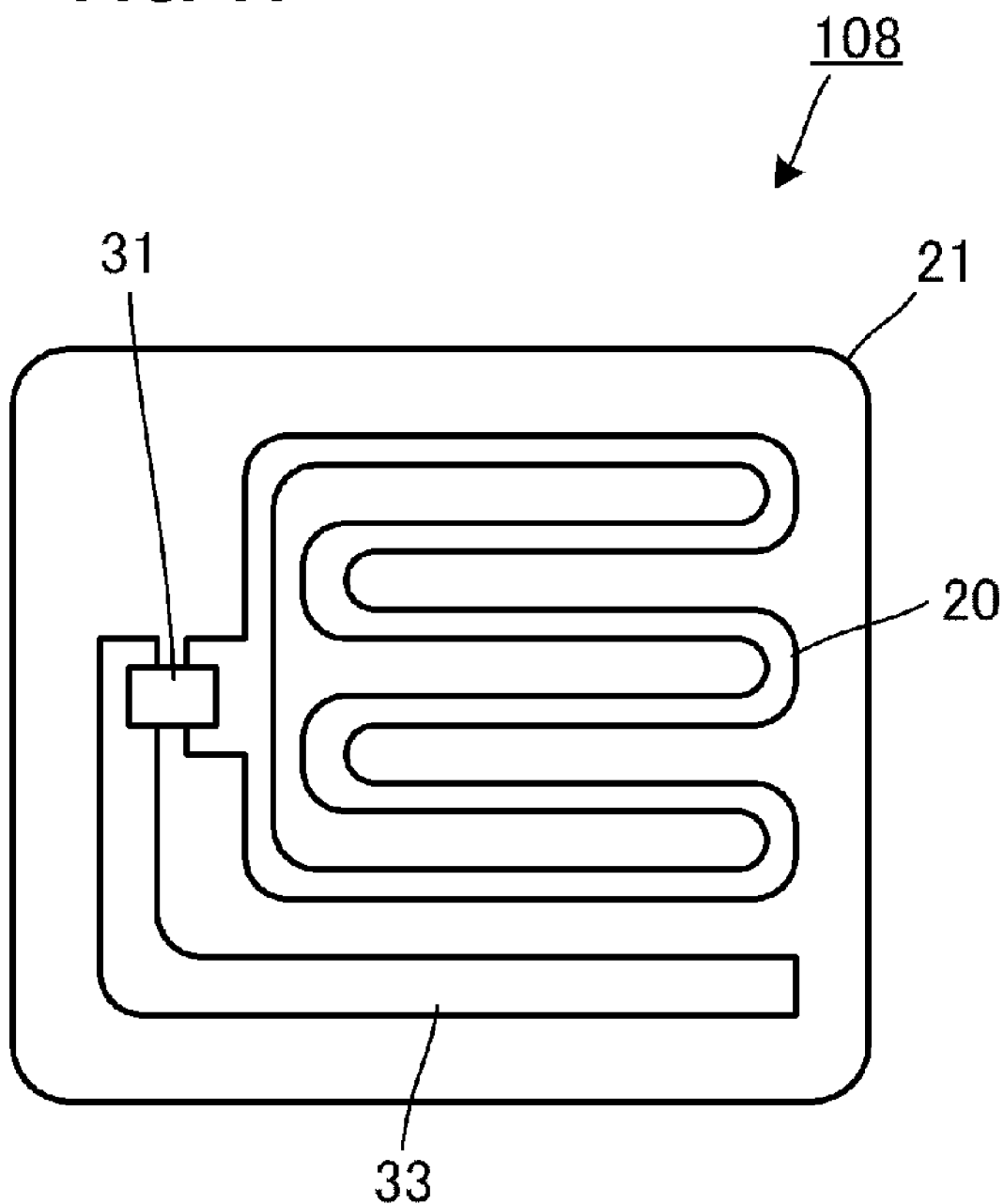
FIG. 11 is a plan view of a wireless IC device according to an eighth preferred embodiment of the present invention.

FIG. 11 is a plan view of a wireless IC device according to an eighth preferred embodiment. A totally looped and partially meandering radiating/resonating electrode 20 is disposed on the top surface of a substrate 21. In addition, a substantially L-shaped radiating electrode 33 is disposed on the substrate 21. A wireless IC 31 is mounted such that terminal electrodes thereof are electrically connected to an end portion of the radiating electrode 33 and a part of the radiating/resonating electrode 20. Since the radiating/resonating electrode 20 acts as a loop antenna constituting a closed loop, the resonant frequency of the radiating/resonating electrode 20 is determined by the inductance component and the capacitance component in the distributed-constant circuit of the closed loop. This resonant frequency is set as the frequency for the resonant tag. Thus, the radiating/resonating electrode 20 acts as a resonant circuit for the resonant tag. On the other hand, the radiating/resonating electrode 20 acts as a radiating electrode formed of a uniform metallic plate in the frequency band for the RFID tag, and constitutes a dipole antenna together with the radiating electrode 33.

Since the radiating/resonating electrode 20 is disposed on one plane so as to have a substantially closed-loop shape instead of having a substantially spiral shape, the radiating/resonating electrode 20 can be provided using only one side of the substrate 21.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A wireless IC device comprising:
    a radiating/resonating electrode disposed on a substrate and defining both as a radiating electrode in a frequency for RFID and as a resonating electrode that resonates at a frequency that is different from the frequency for RFID;
    a wireless IC for RFID mounted on the substrate and electrically connected or electromagnetically coupled with the radiating/resonating electrode; and
    an additional radiating/resonating electrode disposed on the substrate; wherein
    the wireless IC is electrically connected or coupled with the pair of radiating/resonating electrodes.

2. The wireless IC device according to claim 1, wherein the radiating/resonating electrode includes a line electrode portion and a capacitance electrode portion that forms capacitance between both ends of the line electrode portion.

3. The wireless IC device according to claim 2, wherein the capacitance electrode portion includes two capacitance electrodes opposing each other via a dielectric layer in the thickness direction of the capacitance electrode portion, the line electrode portion has a spiral shape that is coiled around the capacitance electrode portion a plurality of times, the radiating/resonating electrode further includes a cross line electrode that is disposed on the substrate and connects one of the capacitance electrodes with the outer end of the spiral line electrode portion, the other capacitance electrode being connected to the inner end of the spiral line electrode portion, and the wireless IC is mounted in the vicinity of the cross line electrode.

4. The wireless IC device according to claim 2, wherein the capacitance electrode portion includes two capacitance electrodes opposing each other via a dielectric layer in the thickness direction of the capacitance electrode portion, and the wireless IC is mounted in the vicinity of one of the capacitance electrodes.

5. The wireless IC device according to claim 1, wherein the wireless IC is a wireless IC chip that is electrically connected to the radiating/resonating electrode.

6. The wireless IC device according to claim 1, wherein the wireless IC is an electromagnetically coupled module including a feeder circuit board that has a matching circuit including inductors and a wireless IC chip that is disposed on the top surface of the feeder circuit board and is electrically connected to the feeder circuit board.

7. A wireless IC device comprising:
    a radiating/resonating electrode disposed on a substrate and defining both as a radiating electrode in a frequency for RFID and as a resonating electrode that resonates at a frequency that is different from the frequency for RFID;
    a wireless IC for RFID mounted on the substrate and electrically connected or electromagnetically coupled with the radiating/resonating electrode; and
    an additional radiating electrode disposed on the substrate, the additional radiating electrode constituting an equivalent dipole antenna in combination with the radiating/resonating electrode; wherein the wireless IC is electrically connected or electromagnetically coupled with the radiating/resonating electrode and the additional radiating electrode;

the radiating/resonating electrode is defined by a first radiating element; and the additional radiating electrode is defined by a second radiating element that is separate and distinct from the first radiating element.

8. The wireless IC device according to claim 7, wherein a line length of the additional radiating electrode corresponds to approximately a quarter-wavelength of the frequency for RFID, and the resonant frequency of the radiating/resonating electrode is lower than the frequency for RFID.

9. The wireless IC device according to claim 7, wherein the radiating/resonating electrode includes a line electrode portion and a capacitance electrode portion that forms capacitance between both ends of the line electrode portion.

10. The wireless IC device according to claim 9, wherein the capacitance electrode portion includes two capacitance electrodes opposing each other via a dielectric layer in the thickness direction of the capacitance electrode portion, the line electrode portion has a spiral shape that is coiled around the capacitance electrode portion a plurality of times, the radiating/resonating electrode further includes a cross line electrode that is disposed on the substrate and connects one of the capacitance electrodes with the outer end of the spiral line electrode portion, the other capacitance electrode being connected to the inner end of the spiral line electrode portion, and the wireless IC is mounted in the vicinity of the cross line electrode.

11. The wireless IC device according to claim 10, wherein the capacitance electrode portion is disposed inside the spiral line electrode portion, and the additional radiating electrode is disposed outside the spiral line electrode portion.

12. The wireless IC device according to claim 9, wherein the capacitance electrode portion includes two capacitance electrodes opposing each other via a dielectric layer in the thickness direction of the capacitance electrode portion, and the wireless IC is mounted in the vicinity of one of the capacitance electrodes.

13. The wireless IC device according to claim 7, wherein the wireless IC is a wireless IC chip that is electrically connected to the radiating/resonating electrode.

14. The wireless IC device according to claim 7, wherein the wireless IC is an electromagnetically coupled module including a feeder circuit board that has a matching circuit including inductors and a wireless IC chip that is disposed on the top surface of the feeder circuit board and is electrically connected to the feeder circuit board.

* * * * *